(12) United States Patent
Wickersham et al.

(10) Patent No.: US 6,362,607 B1
(45) Date of Patent: Mar. 26, 2002

(54) GATED MULTI-PHASE FIXED DUTY CYCLE VOLTAGE REGULATOR

(75) Inventors: Robert D. Wickersham, Lacey; James S. Dinh, Gig Harbor, both of WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/741,728

(22) Filed: Dec. 19, 2000

(51) Int. Cl.[7] .................................................. G05F 1/59
(52) U.S. Cl. ......................................... 323/272; 323/282
(58) Field of Search ................................ 323/271, 272, 323/282

(56) References Cited

U.S. PATENT DOCUMENTS

| | | | | |
|---|---|---|---|---|
| 4,694,227 A | * | 9/1987 | Doman | 323/272 |
| 5,793,191 A | * | 8/1998 | Elmore et al. | 323/282 |
| 5,973,485 A | * | 10/1999 | Kates et al. | 323/272 |
| 6,034,514 A | * | 3/2000 | Sakai | 323/272 |
| 6,043,634 A | * | 3/2000 | Nguyen et al. | 323/272 |
| 6,198,261 B1 | * | 3/2001 | Schultz et al. | 323/272 |
| 6,232,754 B1 | * | 5/2001 | Liebler et al. | 323/282 |

* cited by examiner

*Primary Examiner*—Jeffrey Sterrett
(74) *Attorney, Agent, or Firm*—Mark V. Seeley

(57) ABSTRACT

An improved multi-phase voltage regulator is disclosed. That voltage regulator includes a multi-phase switching signal generator for generating a plurality of out of phase switching signals. Those switching signals define a fixed duty cycle for each of a plurality of switching voltage converters. A switching mechanism is coupled to the multi-phase switching signal generator. That switching mechanism has an input for receiving a feedback voltage and includes logic for enabling and disabling the multi-phase switching signal generator.

14 Claims, 3 Drawing Sheets

GATED MULTI-PHASE FIXED DUTY CYCLE VOLTAGE REGULATOR

FIELD OF THE INVENTION

The present invention relates to voltage regulators and in particular to switching voltage regulators for DC-to-DC voltage regulation.

BACKGROUND OF THE INVENTION

Today's microprocessors operate at high current and low voltage, rendering conventional power delivery techniques, e.g., those that use simple buck regulators, impractical. For example, to deliver power to a microprocessor at 1.2V and 120 A, a system with a 12V power supply requires such voltage regulators to include a relatively large and cumbersome inductor and relatively expensive input capacitors to handle the current. As a result, in many applications multi-phase DC-to-DC converters are being used to meet modern microprocessors' power delivery requirements. Although such a device works like a buck converter, it includes several sets of inductors and pass and flywheel components that are switched on and off in separate phases.

Such a voltage regulator can use smaller inductors and fewer expensive input capacitors, because the switching load is distributed over several phases. This enables easier mounting of components and reduces switching transients. Each phase of such a multi-phase DC-to-DC converter is pulse width modulated to regulate the voltage. Unfortunately, there is a cost associated with that capability. A special controller is required to change the duty cycle for each phase. In addition, varying the duty cycle from one phase to the next can cause significant current imbalances.

Accordingly, there is a need for an improved multi-phase voltage regulator. There is a need for such a device that does not require a special controller to change the duty cycle for each phase, and that is not susceptible to meaningful current imbalances. The voltage regulator of the present invention provides such a device.

DETAILED DESCRIPTION OF THE PRESENT INVENTION

Figure 1:
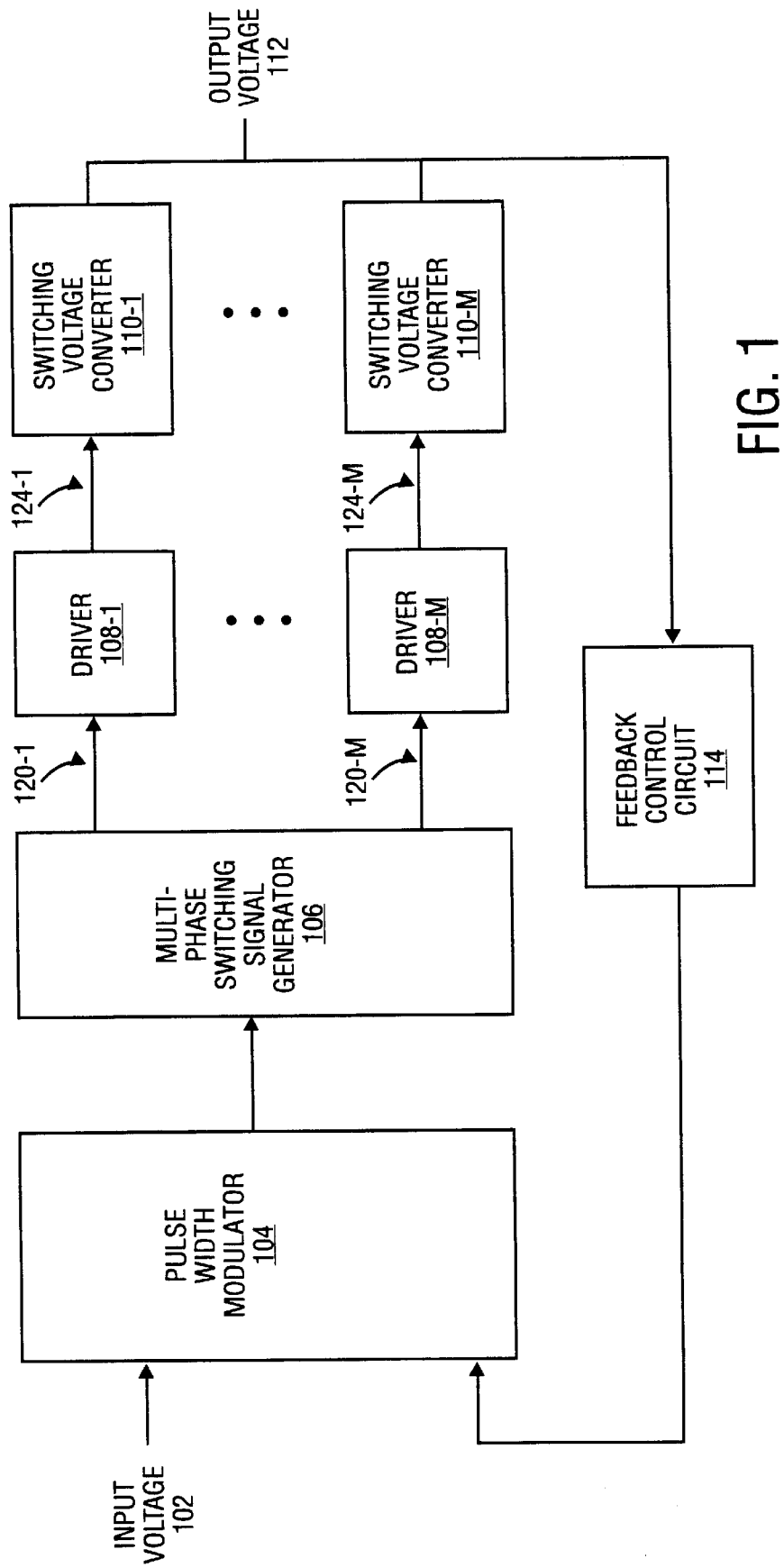
FIG. 1 is a block diagram representing an embodiment of the voltage regulator of the present invention.

A gated multi-phase voltage regulator is disclosed, which includes a multi-phase switching signal generator for generating a plurality of out of phase switching signals. Those switching signals define a fixed duty cycle for each of a plurality of switching voltage converters. A switching mechanism is coupled to the multi-phase switching signal generator. That switching mechanism has an input for receiving a feedback voltage and includes logic for enabling and disabling the multi-phase switching signal generator. The voltage regulator further includes a plurality of drivers, each coupled to an output of the multi-phase switching signal generator, and a plurality of switching voltage converters, each coupled to an output of a driver and to an input voltage. The combined outputs of the switching voltage converters generate an output voltage.

Unlike conventional multi-phase voltage regulators, the voltage regulator of the present invention regulates the voltage by changing the duty cycle for the switching signal generator—not by changing the duty cycle for the switching voltage converters. (The switching signal generator duty cycle is the ratio of (a) the time during which the switching mechanism enables the signal generator to (b) the total switching period—i.e. the time during which the signal generator is on and off. That duty cycle is referenced below as the "duty cycle for switching signal generator operation.") In the following description, numerous details are set forth to provide a thorough understanding of the present invention. However, it will be apparent to those skilled in the art that the invention may be practiced in many ways other than those expressly described here. The invention is thus not limited by the specific details disclosed below. Well known components that are typically used in multi-phase DC-to-DC converters may not be shown in the drawings, or described in detail, so as not to obscure the invention.

FIG. 1 illustrates a gated multi-phase voltage regulator according to one embodiment of the present invention. Voltage regulator 100 includes pulse width modulator 104, multi-phase switching signal generator 106, a number of drivers 108 equal to the number of phases (shown as 108-1 through 108-M), a similar number of switching voltage converters 110 (shown as 110-1 through 110-M), and a feedback control circuit 114. Input DC voltage 102, from a power supply (not shown), is input into regulator 100. Regulator 100 converts input DC voltage 102 to output DC voltage 112. Output DC voltage 112 will be delivered to a load, which may be a microprocessor or other type of integrated circuit. In addition, output DC voltage 112 is fed back to pulse width modulator 104.

Pulse width modulator 104 provides a drive signal that turns multi-phase switching signal generator 106 on and off in response to the sensed value of output DC voltage 112. Pulse width modulator 104 thus serves as a switching mechanism, which is coupled to generator 106, that has an input for receiving a feedback voltage and logic for enabling and disabling generator 106 in response to the feedback voltage value. When enabled, switching signal generator 106 produces a number of switching signals 120 that are equal to the number of phases M (shown as 120-1 to 120-M). Generator 106 drives those signals at regular, fixed intervals—controlled by a stable switching clock signal (not shown)—to define a fixed duty cycle for each of switching voltage converters 110-1 through 110-M. By ensuring that the duty cycle for each phase is identical, generator 106 ensures an equal current distribution to each phase, regardless of compensation and other characteristics of pulse width modulator 104.

In a preferred embodiment of the present invention, generator 106 includes logic for changing that fixed duty cycle. That fixed duty cycle may be changed by varying the width of the "on" time switching signal, as will be apparent to those skilled in the art. Such a feature may be desired to accommodate changes in input voltage. Although a preferred embodiment of the present invention may include a multi-phase switching signal generator that can change the fixed duty cycle, those skilled in the art will appreciate that a voltage regulator does not require this particular feature to benefit from the present invention. The switching signals may be square-wave in shape, and are out of phase from one another. For each of the M phases, the switching signal power is boosted by driver 108 (the boosted signals are depicted by lines 124-1 through 124-M), which provides the power necessary to drive switching voltage converter 110 at a high frequency.

In the example embodiment that FIG. 1 illustrates, switching voltage converter 110 represents a series-switch step-down converter. Such converters can produce a lower voltage from a higher one by using a low-impedance transistor switch that is made to open and close periodically between input and output. The transistor switch is driven by the switching voltage that switching signal generator 106 produces. Output DC voltage 112 is generated by combining the outputs of the switching voltage converters 110. Those outputs will be a function of those converters' fixed duty cycle and the duty cycle for switching signal generator 106 operation. In this embodiment, feedback control circuit 114 provides the feedback necessary for voltage regulation. The particular implementation of feedback control circuit 114 can vary according to whether a voltage mode topology or a current mode topology is used. Feedback control circuit 114 may be made from circuits and components that are conventionally used for this type of device.

Pulse width modulator 104, switching signal generator 106, drivers 108 and switching voltage converters 110 may comprise standard circuits like those used in conventional multi-phase pulse width modulated voltage regulators. In this respect, pulse width modulator 104 may be any device that can vary the width of the "on" time signal, which is applied to generator 106, in response to a varying feedback voltage. Pulse width modulator 104 may adjust the duty cycle for switching signal generator 106 operation in response to any change in feedback voltage. Alternatively, pulse width modulator 104 may include logic that enables multi-phase switching signal generator 106 when the feedback voltage falls below a first value and disables multi-phase switching signal generator 106 when the feedback voltage rises above a second value.

Multi-phase switching signal generator 106 may include circuits that are conventionally used to generate switching signals that control switching voltage converters, which are used in multi-phase voltage regulators. Because, however, the switching signal generator of the present invention drives signals that define a fixed duty cycle, generator 106 does not require logic to change the duty cycle of each phase. Eliminating those relatively complex circuits should enable generator 106 to be less expensive than devices that include logic for changing the duty cycle of each phase.

Pulse width modulator 104 and multi-phase switching signal generator 106 may be implemented as separate components or combined in a single integrated component. Drivers 108 can be devices that are conventionally used in multi-phase voltage regulators, e.g., Semtech's high speed synchronous power MOSFET smart driver SC1405, and the supporting circuitry generally used with that component. Likewise, switching voltage converters 110 can be made with components that are conventionally used to make that type of device. By distributing the switching load over several phases, converters 110 may work with smaller inductors and fewer expensive input capacitors, when compared to the inductors and capacitors that single phase voltage regulators require.

Figure 2:
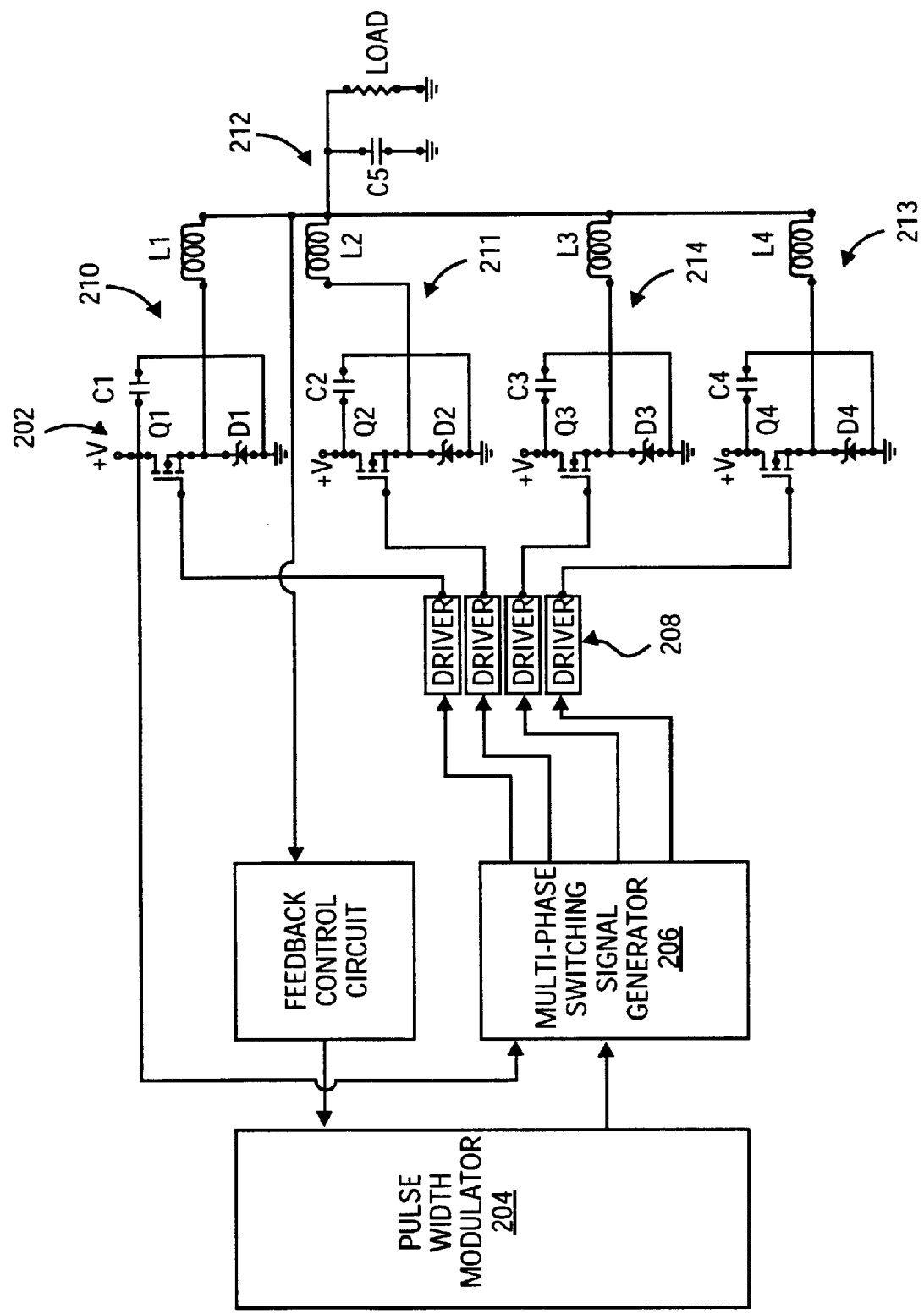
FIG. 2 is a block diagram representing an embodiment of a four phase voltage regulator that is made in accordance with the present invention.

In a preferred embodiment of the present invention, the gated multi-phase fixed duty cycle voltage regulator includes at least four drivers and at least four switching voltage converters. FIG. 2 represents a voltage regulator that operates over four phases. In this example, multi-phase switching signal generator 206 generates switching signals over four phases, where the signals from one phase to the next are separated by 90°.

Pulse width modulator 204 modulates the pulse width of the drive signal delivered to generator 206 to vary the amount of time that switching signal generator 206 is switched on. When turned on, generator 206 causes switching voltage converters 210, 211, 213 and 214 to couple input DC voltage 202 to output DC voltage 212. Positioned between input DC voltage 202 and output DC voltage 212 are several inductors, as is the conventional practice.

Output DC voltage 212 is a function of the voltage regulator's duty cycle and the input DC voltage. That duty cycle is a function of the fixed duty cycle, which generator 206 sets for each phase, and the duty cycle for switching signal generator 206 operation, i.e., the ratio of (a) the time during which pulse width modulator 204 enables generator 206 to (b) the total switching period for generator 206. As is well known in the art, any desired output voltage lower than the input voltage can be obtained by varying the time during which the switching voltage converters are switched on.

Figure 3:
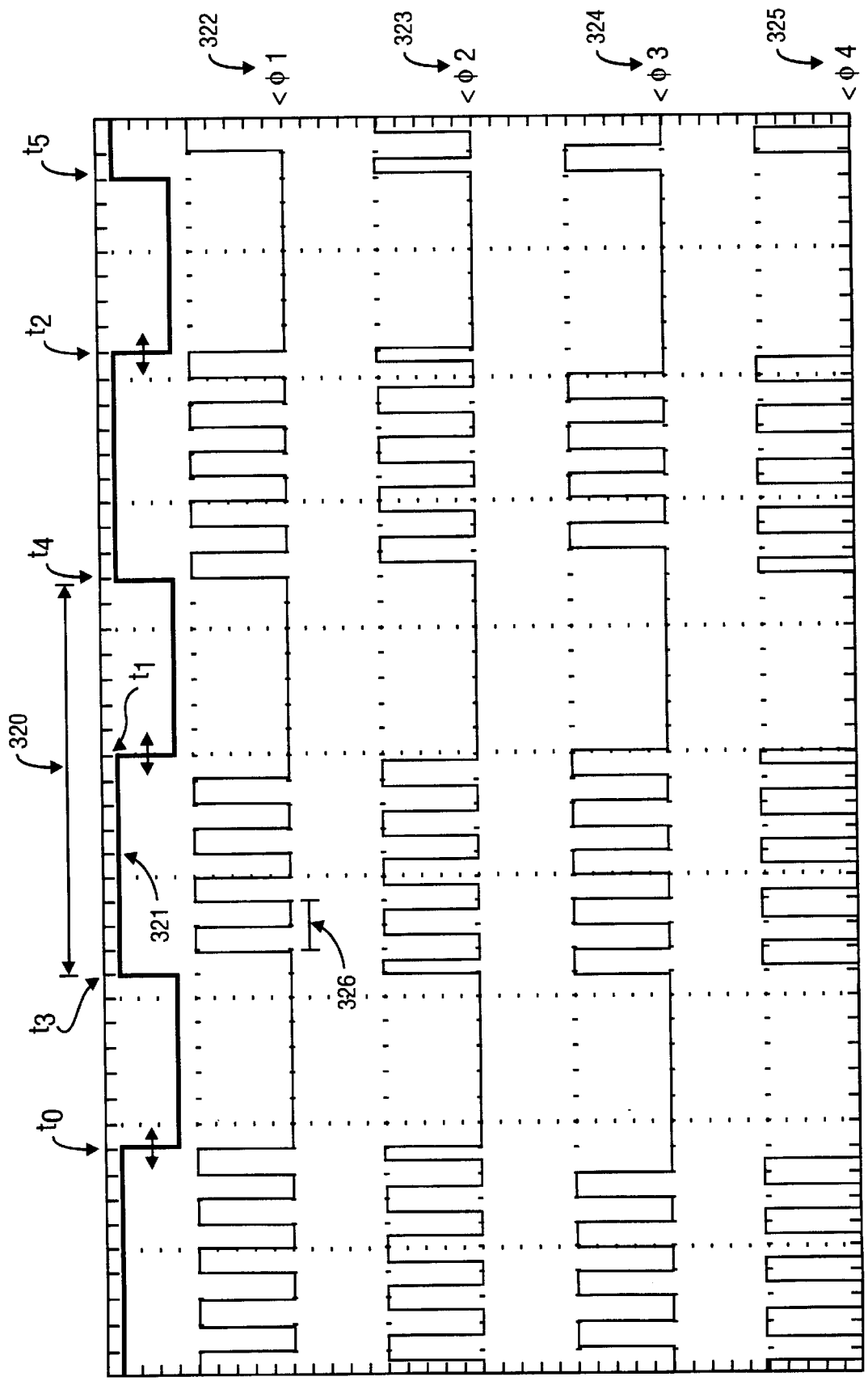
FIG. 3 illustrates a waveform that may result when operating the voltage regulator of FIG. 2.

Generator 206 must set a fixed duty cycle for each phase that ensures that the sum of their output voltages, if generator 206 was perpetually on, would be greater than output DC voltage 212. By doing so, pulse width modulator 204 can regulate output DC voltage 212 by intermittently enabling and disabling generator 206. FIG. 3 illustrates a waveform that may result, when operating the voltage regulator of FIG. 2. Pulse width modulator 204 enables and disables generator 206 over switching period 320. The width of enable interval 321 may vary in response to a feedback voltage. If output DC voltage 212 must be increased, enable interval 321 is lengthened—increasing the duty cycle for generator 206 operation. If output DC voltage 212 must be decreased, enable interval 321 is shortened—decreasing the duty cycle for generator 206 operation.

When pulse width modulator 204 enables multi-phase switching signal generator 206, generator 206 drives switching signals over four phases 322, 323, 324 and 325. As shown, the duty cycle for each phase, e.g., over switching period 326, is fixed. In this embodiment, each phase completes between four and five switching period cycles between the time pulse width modulator 204 enables generator 206 and the time pulse width modulator 204 disables generator 206. Because pulse width modulator 204 can operate at a much lower frequency than the switching clock frequency (which controls the rate at which generator 206 drives signals to drivers 208), relatively inexpensive single phase controllers and simple compensation circuits can be used to make that component.

FIG. 3 represents a voltage regulator in which generator 206 includes logic for enabling completion of a phase's "on" cycle, which was interrupted when the pulse width modulator disabled generator 206, when the pulse width modulator subsequently enables generator 206. For example, note that the "on" cycles for phases 323 and 325 were interrupted when pulse width modulator 204 disabled generator 206 at times $t_0$, $t_1$, and $t_2$. When pulse width modulator 204 subsequently enabled generator 206, at times $t_3$, $t_4$, and $t_5$, the interrupted "on" cycles for those phases were completed.

Such a feature enables a given phase to maintain its fixed duty cycle across successive enable cycles for generator 206. A phase that, for example, has completed a given percentage of its "on" cycle, e.g., 90%, when generator 206 is disabled, will complete the remaining 10% of that "on" cycle after generator 206 is again enabled. Although a preferred embodiment of the present invention may include a multi-phase switching signal generator that provides this capability, those skilled in the art will appreciate that a voltage regulator does not require this particular feature to benefit from the present invention. Although the embodiment illustrated in FIGS. 2 and 3 relates to a four phase multi-phase voltage regulator, a different number of phases may be established, as will be determined by the associated logic.

An improved voltage regulator has been described. By combining a multi-phase switching signal generator, which defines a fixed duty cycle for a plurality of switching voltage converters, with a switching mechanism that enables and disables that generator in response to a feedback voltage, the gated multi-phase voltage regulator of the present invention may offer significant advantages. While maintaining the benefits of conventional multi-phase converters (e.g., enabling the use of smaller inductors and fewer expensive input capacitors), the gated multi-phase voltage regulator of the present invention prevents substantial current and thermal imbalances between phases and improves overall efficiency. In addition, because the gated multi-phase voltage regulator of the present invention provides fixed duty cycle operation, it does not require—regardless of the number of phases used—the relatively expensive controller that other multi-phase converters require to enable the duty cycle of each phase to be varied.

The gated multi-phase fixed duty cycle voltage regulator of the present invention may be integrated into a computer system in many ways including, but not limited to, by mounting it to a motherboard or other printed circuit board, incorporating it onto an interposer, or integrating it onto the same substrate that holds a microprocessor or other integrated circuit. Additional components that may be included in the illustrated voltage regulators have been omitted as they are not useful to describe aspects of the present invention. Although the foregoing description has specified a voltage regulator that includes certain features, those skilled in the art will appreciate that many modifications and substitutions may be made. For example, although a single phase controller may be used to enable and disable the switching signal generator, other pulse width modulation schemes can be used to perform that function. Accordingly, it is intended that all such modifications, alterations, substitutions and additions be considered to fall within the spirit and scope of the invention as defined by the appended claims.

What is claimed is:

1. A voltage regulator comprising:
    a multi-phase switching signal generator for generating a plurality of out of phase switching signals that define a fixed duty cycle for each of a plurality of switching voltage converters;
    a pulse width modulator, coupled to the multi-phase switching signal generator, the pulse width modulator having an input for receiving a feedback voltage and including logic for enabling and disabling the multi-phase switching signal generator at a selected frequency over a selected period, and for varying the length of time that the multi-phase switching signal generator is enabled in response to the value of the feedback voltage; and
    a plurality of drivers, each coupled to an output of the multi-phase switching signal generator;
    wherein each of said plurality of switching voltage converters is coupled to an output of a driver and coupled to an input voltage, and wherein the combined outputs of the switching voltage converters generate an output voltage.

2. The voltage regulator of claim 1 wherein the pulse width modulator and the multi-phase switching signal generator are combined in a single integrated component.

3. The voltage regulator of claim 2 further comprising at least four drivers and at least four switching voltage converters that can operate over four phases.

4. The voltage regulator of claim 3 wherein the multi-phase switching signal generator includes logic for enabling completion of a phase's on cycle, which was not completed when the pulse width modulator disabled the multi-phase switching signal generator, when the pulse width modulator subsequently enables the multi-phase switching signal generator.

5. The voltage regulator of claim 4 wherein the logic for enabling and disabling the multi-phase switching signal generator enables the multi-phase switching signal generator when the feedback voltage falls below a first value and disables the multi-phase switching signal generator when the feedback voltage rises above a second value.

6. The voltage regulator of claim 4 wherein the multi-phase switching signal generator includes logic for changing the fixed duty cycle.

7. A voltage regulator comprising:
    a pulse width modulator having an input for receiving a feedback voltage and logic for enabling and disabling a multi-phase switching signal generator at a selected frequency over a selected period, and for varying the length of time that the multi-phase switching signal generator is enabled in response to the value of the feedback voltage;
    a multi-phase switching signal generator, coupled to the pulse width modulator, for generating a plurality of out of phase switching signals that define a fixed duty cycle for each of a plurality of switching voltage converters; and
    a plurality of drivers, each coupled to an output of the multi-phase switching signal generator;
    wherein each of said plurality of switching voltage converters is coupled to an output of a driver and coupled to an input voltage, and wherein the combined outputs of the switching voltage converters generate an output voltage.

8. The voltage regulator of claim 7 wherein the multi-phase switching signal generator includes logic for causing an interrupted on cycle for a phase to be completed, when the pulse width modulator enables the multi-phase switching signal generator.

9. The voltage regulator of claim 8 wherein the multi-phase switching signal generator includes logic for changing the fixed duty cycle.

10. The voltage regulator of claim 9 wherein the multi-phase switching signal generator defines at least four phases.

11. A method for regulating a voltage comprising:
    intermittently enabling and disabling at a selected frequency over a selected period, in response to a feedback voltage, a multi-phase switching signal generator such that the multi-phase switching signal generator is enabled for varying lengths of time;
    generating from that multi-phase switching signal generator a plurality of out of phase switching signals that define a fixed duty cycle for each of a plurality of switching voltage converters;
    driving those out of phase switching signals to said plurality of switching voltage converters; and
    combining the outputs of those switching voltage converters to produce an output voltage.

12. The method of claim 11 further comprising:
    disabling the multi-phase switching signal generator before a phase's on cycle has completed, then
    completing that on cycle, when the multi-phase switching signal generator is subsequently enabled.

13. The method of claim 12 wherein the step of generating a plurality of out of phase switching signals defines at least four phases.

14. The method of claim 13 further comprising changing the fixed duty cycle.

* * * * *